Patented July 13, 1937

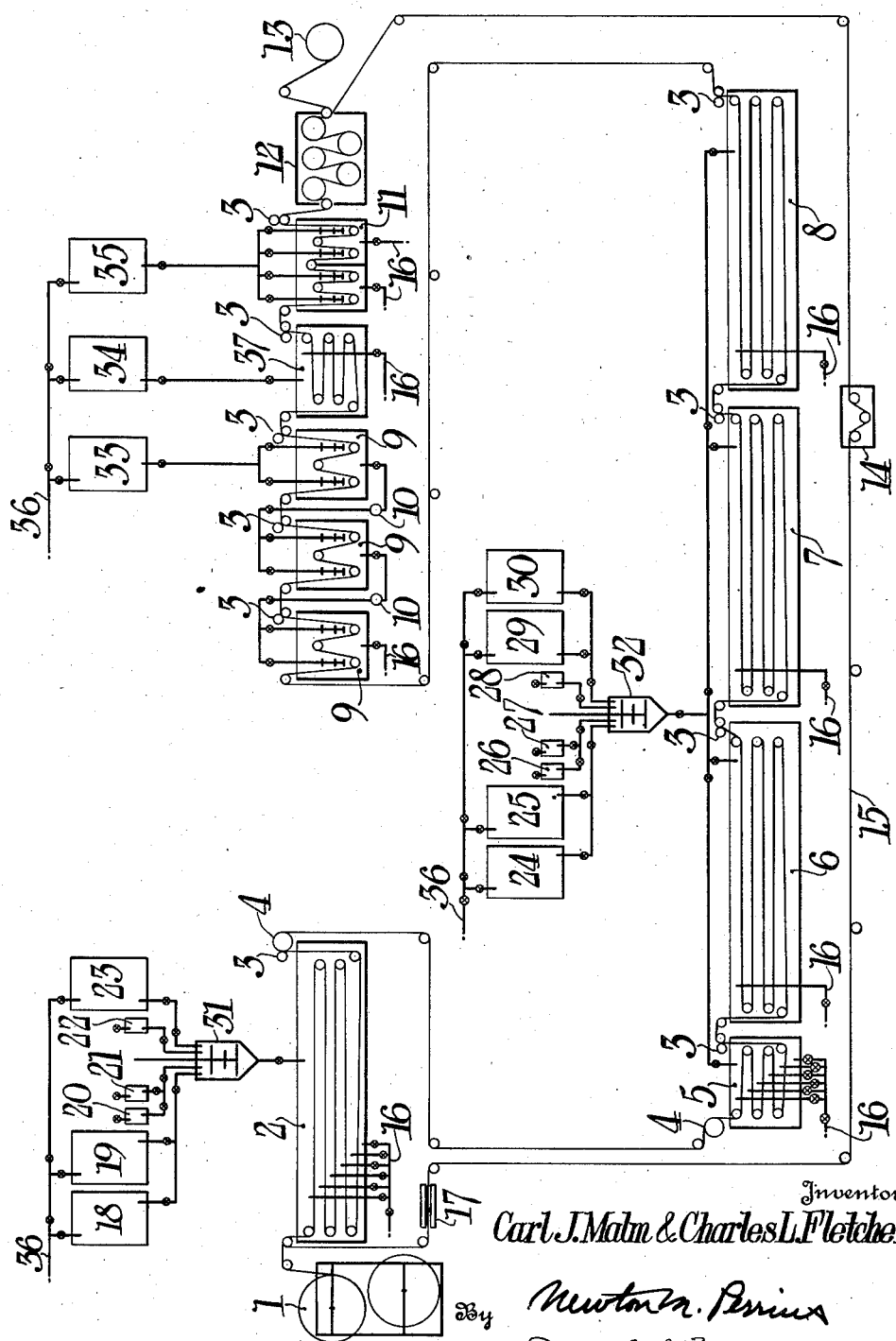

2,087,036

UNITED STATES PATENT OFFICE 2,087,036

PROCESS FOR THE CONTINUOUS ESTERIFICATION OF CELLULOSE

Carl J. Malm and Charles L. Fletcher, Rochester, N. Y., assignors, by mesne assignments, to Eastman Kodak Company, Jersey City, N. J., a corporation of New Jersey Application September 10, 1932, Serial No. 632,559

5 Claims. (Cl. 260—101)

The present invention relates to the continuous esterification of cellulose by passing it thru a series of treatment baths including at least one which esterifies the cellulose without changing its physical form.

Heretofore in the manufacture of cellulose esters the esterification process was intermittent, the batch method being employed. Obviously this method is much less efficient than would be a process of continuous esterification, as in the former method, much more apparatus and a greater amount of reagents are necessary at a given instant to produce the same amount of cellulose ester as would be the case where a continuous esterification process is carried out. Others have previously recognized that a continuous esterification process is desirable, for example in British Patents Numbers 270,656 and 274,814, in which the cellulose was reacted upon as it was continuously passed thru a cylinder resulting in a cellulose ester dope. In those patents it was recognized that in a continuous dope esterification process the stirring of the fibers and also the thick viscous dope formed creates quite a difficult problem. It is apparent that many other technical difficulties such as the uniform application of mechanical power, maintenance of the proper temperature, maintaining the proper degree of the esterification process in the particular portion of the cylinder best adapted for the treatment predetermined for that portion etc. render these previously proposed continuous esterification processes of little practical value.

One object of our invention is to provide a continuous process for esterifying cellulose in which no formation of dope or gum, and no mechanical agitation are necessary. A further object of our invention is to provide a process for the preparation of a fully esterified cellulose (such as cellulose triacetate) which does not involve the difficulties of technique and operation which have been previously associated with continuous esterification processes. Another object of our invention is to provide a process and apparatus for preparing cellulose acetate which is more economical and more easily operated than the batch or intermittent esterification processes employed at the present time. Another object of our invention is to provide a process and apparatus for preparing a cellulose ester in which the cellulose may be continuously fed into the apparatus at one end thereof and a substantially completely esterified cellulose, which has been washed, stabilized and dried, may be continuously removed at the other end of the apparatus. Other objects of our invention will hereinafter appear.

We have found that cellulosic material may be formed into a sheet or layer and passed through the entire series of esterification steps to produce an ester of cellulose which has been substantially completely esterified. We have found that by our esterification process cellulose may be continuously fed into one end of our apparatus and a cellulose ester in dry form may be continuously withdrawn at the other end. We have found an apparatus for the carrying out of a continuous esterification in which the ratio of the time of pretreatment of cellulose to the time of esterification thereof may be readily varied when and to the degree desired.

Our invention relates to the continuous esterification of cellulose by preparing it in a flattened or layer form and passing this layer, carried by a suitable support, thru the various reaction baths employed consecutively for the preparation of the cellulose ester, allowing the cellulose to consume a predetermined amount of time in passing thru each individual bath. The reaction baths employed to complete the esterification have a non-solvent therein so that the cellulose during and after its esterification retains its original form. As the process is usually carried out the layer of cellulosic material is washed with a non-solvent of the ester, stabilized and dried after it has been esterified so that it comes out of the apparatus in the form of a dry layer or sheet of the cellulose ester which has been prepared.

The accompanying drawing, represents diagrammatically in section, apparatus according to the present invention. The apparatus illustrated consists of a roll 1 containing the cellulosic material which for the sake of convenience is put up in the form of rolls, two of which are present on the rack in the diagram, a pretreatment tank 2, a preliminary esterification tank 5 and the esterification tanks 6, 7 and 8 together with auxiliary apparatus appended thereto. Each of the tanks including also those for washing, stabilizing and drying are equipped with a series of rolls between which a belt 15 alternates as shown in the diagram. This belt 15 may be either a perforated belt or a wire net composed of or coated with a non-corrosive metal such for example as a stainless steel containing 8% nickel and 18% chromium. This belt 15 is for the purpose of supporting or carrying the sheet of cellulosic material. Squeeze rolls 3 and in some cases cooling rolls 4 are provided between the respective tanks to prepare the cellulosic material which exits from one bath, for the succeeding treatment. As will be observed from the diagram the belt 15 is endless and is provided with a compensator 14 to equalize the tension and with a dryer 17 to remove moisture from the belt preliminary to its contact with the cellulosic starting material.

The washing tanks 9 are arranged for the counter-current washing of the cellulosic material after it has been esterified. The tank 37 is for the purpose of boiling the ester in a purified water to stabilize it (which step is described at length in Clarke and Clarke application Serial No. 540,108 filed May 26, 1931) and to drive off any organic non-solvent that may be present therein, the tank 11 is for finally washing the ester layer with water and the drying chamber 12 contains drying rolls, which may be heated in any manner desired such as by steam or electricity, over which the cellulose ester sheet passes and from which chamber it passes to a roll 13, on which it is wound.

The tanks 9 are supplied with pipe lines from the bottom of one to the top of the one preceding, these pipe lines being provided with pumps 10 for lifting the fluid thru these lines.

Pretreatment tank 2 and preliminary esterification tank 5 are each fitted with a stepped overflow so that the level of the baths in these tanks may be regulated as desired which level is a factor in regulating the time of treatment of the cellulose in these tanks as is obvious from the diagram. All the tanks are fitted with pipe lines 16 to carry the liquids to recovery apparatus. In the case of the tanks employed for the pretreatment, esterification and stabilization, overflow pipes, 16 are provided as shown in the drawing while in the case of the washing portion of the apparatus the pipe lines 16 are situated to completely remove the liquids from those tanks. However these pipe lines 16, may be arranged in all the tanks so that they drain from the bottom or all the tanks may be fitted with both overflow and bottom drainage if desired. Although the tanks as shown in the diagram are not all arranged in a straight line due to the limitations of space, it is preferred that these tanks be arranged in a straight line instead of in the arrangement shown.

Our apparatus may be equipped with tanks for supplying reagents such as 18, 19, 20, 21, 22, 23, 24, 25, 26, 27, 28, 29, 30, 33, 34 and 35. As regards tanks 18—30 the smaller tanks are adapted for containing the catalyst while the larger tanks may be used for containing organic acids and anhydrides and the non-solvent. For instance, 18 and 19 may be denominated organic acid tanks, 23 may be used for acid or anhydride depending on the pretreatment to be employed, 24 and 25 may be denominated anhydride tanks, 29 may be for the non-solvent and 30 for organic acid. Obviously the particular process to be carried out in our apparatus will be a determining factor as to the purpose to which each individual tank will be put. Tanks 33 and 35 are for containing wash liquor while 34 is the stabilizing liquor tank. The contents are supplied to these tanks thru pipe lines 36 which as illustrated present only one supply pipe for each battery of tanks. However if desired each individual tank may be equipped with a separate pipe for supplying the proper liquid thereto. The two batteries of tanks, 18—23 and 24—30 which serve the pretreatment and the esterification tanks respectively are provided with mixing tanks (provided with stirring apparatus) 31 and 32 respectively to prepare the reaction baths for the particular tanks in which they are placed.

In our process the cellulose to be esterified is employed in sheet form made from cotton linters, sulfite pulp or other cellulosic material. It is convenient to wind these sheets on a spool to form a roll which may be placed on the rack 1 in readiness for use. It is then led onto a non-corrosive perforated belt or wire net 15, which supports the sheet throughout the process, and passed through a tank 2 which contains the pretreatment liquid.

This pretreatment liquid may be either acetic acid containing a catalyst or a higher homologue of acetic acid such as propionic or butyric acid, or a mixture of these acids with or without a catalyst. The acids may be supplied from any or all of tanks 18, 19 and 23 and the catalyst from any or all of tanks 20, 21 and 22, the catalyst being mixed with the acid in the mixing tank 31. Depending on the length of time desired for the pretreatment, the level of the liquid in the pretreatment tank may be adjusted by using one of the overflows shown in the drawing. The pretreatment bath may be heated if desired such as by steam coils (not shown) to a temperature above normal the degree of which depends on the ester to be manufactured and the process employed. From this pretreatment tank the sheet is passed between squeeze rolls, 3, and over cooling rolls, 4, to a preliminary esterification tank 5. This preliminary esterification tank contains a fatty acid anhydride, preferably diluted with a fatty acid and a catalyst. The length of time for this preliminary esterification may also be adjusted by using the overflows to adjust the level of the liquid in the tank. In this preliminary esterification, the cellulose is esterified to a content of about 15–30% of combined acyl after which it is passed into tank 6 through the squeeze rolls 3 which remove some of the liquid contained therein. Although in this preliminary esterification no non-solvent is employed, the cellulose is esterified only up to that point at which it will remain insoluble in the acetic acid of the esterification bath. The cellulose is then passed through tanks 6, 7 and 8 which constitutes a series of fibrous esterification baths each containing a fatty acid anhydride, catalyst and a non-solvent. Obviously the composition of these baths and the temperature at which they are to be maintained depends upon the type of ester to be manufactured and the pretreatment which the cellulose has obtained. The ingredients for these baths are supplied from tanks 24—30 and these are mixed in mixing tank 32 before admitting them to the esterification tanks.

By the time the sheet leaves the final esterification tank 8, the cellulosic material should be fully esterified. The time of esterification may be varied according to conditions and the judgment of the individual operator by increasing or decreasing the speed of the belt, depending on what effect is desired. The fully esterified cellulosic material is passed thru squeeze rolls to remove the excess of esterification liquid and is then passed through a series of counter-current wash tanks 9, where it is washed preferably with an organic non-solvent. It is then passed from these wash tanks 9, into a boiling tank, 37, where the ester is boiled in a purified water and the non-solvent which may be present evaporates off. The cellulose ester layer is then passed thru a water wash tank 11 and drying rolls 12 from which the cellulose ester is taken up on rolls 13.

The supporting belt which is endless returns thru a drier 17 to a pretreatment tank.

The preparation of a cellulose acetate, for example may be carried out in accordance with our invention as follows:

A roll of sulfite pulp sheet was gradually unrolled by running it on to the belt and into the pretreatment bath of an apparatus as described above. The pretreatment bath may consist of acetic acid containing 1/3% of sulfuric acid and 1% of phosphoric acid, the temperature of the bath being maintained at about 100° F. and the time of pretreatment adjusted to about 3 hours. The sheet was then led thru squeeze rolls and also cooling rolls which lowered the temperature of the sheet to about 60° F. into the preliminary esterification tank where the sheet was treated with a mixture of one part of acetic anhydride and three parts of acetic acid and containing about 1/3% sulfuric acid at a temperature of 70° F. The level of the bath in the tank was adjusted so that the treatment lasted about 1 hour. This preliminary esterification bath contains no non-solvent but the esterification of the cellulose in this bath is not permitted to reach that point at which the esterified cellulose will dissolve in the bath to form a dope. If this precaution should not be taken the process in its entirety would be rendered impractical.

The sheet was then led through the esterification tanks which contained esterification baths comprising dibutyl ether and acetic anhydride together with about 1/2% of sulfuric acid, the ratio of dibutyl ether to acetic anhydride being 2:1. The temperature of the bath in tank 6 was maintained at about 80° F., that in tank 7 at about 90° F. and that in tank 8 at about 100° F. The speed of the belt was adjusted so that the cellulose passes through each tank in about 3 hours. The sheet which now comprised a fully acetylated cellulose was passed through squeeze rolls, washed counter-currently with isopropyl ether, boiled in purified water, washed with water, dried and taken up on a spool. The product wound upon the roll was a fully esterified cellulose acetate soluble in chloroform-alcohol.

Other esters may also be prepared according to our invention as illustrated by the following example of preparing cellulose acetate-propionate:

A cotton linter sheet was led into the pretreatment tank on a belt in the manner described above where the sheet was subjected to pretreatment with a bath consisting of 80% of propionic acid, 20% of acetic acid and no catalyst. The temperature of the bath was maintained at about 150° F. and the level of the bath in the tank was adjusted so that 3 hours would be consumed by the sheet in passing through the pretreatment bath. The sheet was then pressed and cooled to about 60° F. by passing it through the squeeze and cooling rolls and was then led through the bath in the preliminary esterification tank which bath contained a mixture of 50% of propionic anhydride and 50% of acetic anhydride to which 1/2% of perchloric acid had been added. This treatment lasted about an hour and the bath was maintained at a temperature of about 70° C. The sheet was then led through the baths in tanks 6, 7 and 8 which contained a mixture of acetic and propionic anhydrides, n-propyl ether and perchloric acid catalyst, the ratio of the non-solvent to the anhydrides being approximately 2:1. The process was otherwise carried out in the same way as described for preparing cellulose acetate in the preceding example.

Other esters of cellulose whether organic or not may be prepared in our apparatus and by our invention, the composition of the baths in the case of each individual ester being known to the operator skilled in the art. Our invention may be applied to any esterifiable material which can be formed into flexible sheets and which when esterified will not dissolve or disperse in the esterification bath, however, it is particularly adapted for preparation of the esters of cellulose. Some of the cellulose esters which may be prepared according to the process of our invention in addition to cellulose acetate and cellulose acetate-propionate are cellulose butyrate, cellulose propionate, cellulose acetate-butyrate.

We prefer to employ as the non-solvent in the esterification baths such as in tanks 6, 7 and 8 an ether having a boiling point above 70° C. such ethers in fibrous esterification baths being described and claimed in Malm and Fletcher application Serial No. 590,509. However, other non-solvents such as carbon tetrachloride, benzene, cymene, a lower ether or any other non-solvent compatible in the particular process carried out may be employed in that capacity in our invention.

Various modifications of our invention desired by those skilled in the art such as variations of time, temperature, manner of passing the sheet through the baths, composition of the various baths etc. are also within the scope of our invention and are understood to be covered by the appended claims.

The apparatus which we have described may be modified or abbreviated as desired by the individual operator. For example the washing, stabilizing and racking parts of the apparatus may be omitted and the washing and stabilizing could be carried out in other apparatus. The number of esterification tanks may be reduced to 2 or even 1, however three tanks allow better control of the conditions of esterification. Obviously the number of esterification tanks may be more than 3, or the tanks shown may be any length desired. Obviously if the length of sheet which will be immersed in the esterification bath is increased the speed with which the sheet is passed therethrough may also be increased, and vice versa. Thus to speed up production it is desirable to arrange the apparatus so as to retain the sheet in the esterification bath for a considerable linear distance as will be apparent to those skilled in the art. The supply and mixing tanks when used in conjunction with the apparatus as shown contribute to the convenience of operation of the apparatus, however the preparation of the various baths can be carried out in an apparatus independent of that employed for the esterification and the mixture may then be transported to the proper tank in any desired manner.

From the foregoing specification and the claims appended hereto, it will be observed that among the important distinguishing features of our invention is the continuity of the esterification process herein described. Another important feature is the preliminary esterification given to the cellulose. The pretreatment, of course, makes the cellulose more susceptible to esterification. The preliminary esterification, as pointed out, does not reach a point where the cellulose ester produced becomes soluble in the preliminary esterification bath. This preliminary esterification, however, serves to produce a much more uniform product than would otherwise be obtained. It is well known that in fibrous esterification processes, difficulties are encountered with obtaining uniform esterification of the cellulose throughout the cross section of the fiber. The preliminary esterification bath would, if permitted to go far enough, produce a dope of the cellulose ester. However, the partial esterification of the cellulose does not permit doping even in a dope formula and at the same time results in an entirely uniform esterification of the cellulose throughout the cross section of the fibers. Thus, the cellulosic material enters the first of the fibrous esterification baths with uniform esterification throughout the cross section of the fiber to the extent of some 15 to 30% of combined acyl and the remaining proportion of acyl introduced into the fiber esterifies the fiber uniformly throughout.

Not only is uniformity of esterification up to the acylation step assured, but the fiber is made more permeable to the penetration of the fibrous esterification baths, thereby assuring uniformity of acylation by the fibrous esterification baths which heretofore have had their drawbacks due to non-uniformity of esterification.

Another important feature of our invention which cooperates with the foregoing to produce a uniform product is the increasing temperature at which the succeeding fibrous esterification baths are maintained. Each of the fibrous esterification baths, it will be noted, introduces a further percentage of acyl radicals into the cellulose material. However, to avoid any hindrance to the reaction, due to the greater extent of the esterification, the temperature of the succeeding fibrous esterification bath is maintained at an increasing degree, so as to make the esterification by succeeding baths the more effective. All of these features cooperate to produce a product not only in a continuous manner but a product having unusual uniformity of esterification throughout the cross section of the fiber.

We claim as our invention:

1. A process of esterifying cellulose which comprises continuously passing a sheet of the cellulose through an esterification bath containing an appreciable amount of an aliphatic ether having a boiling point above 70° C.

2. A process of acetylating cellulose which comprises continuously passing a sheet of the cellulose through an esterification bath containing acetic anhydride and an aliphatic ether having a boiling point above 70° C.

3. A process of preparing cellulose acetate which comprises continuously passing a sheet of cellulose through (1) a pretreatment bath consisting of acetic acid and a small amount of catalyst, (2) a preliminary esterification bath containing acetic acid, acetic anhydride and a small amount of catalyst and (3) an esterification bath containing acetic anhydride, an aliphatic ether having a boiling point above 70° C. and a small amount of catalyst.

4. A process of preparing cellulose acetate which comprises continuously passing a sheet of cellulose through (1) a pretreatment bath consisting of acetic acid and a small amount of catalyst, (2) a preliminary esterification bath containing acetic acid, acetic anhydride and a small amount of catalyst and (3) an esterification bath containing acetic anhydride, dibutyl ether and a small amount of catalyst.

5. A process of preparing cellulose acetate-propionate which comprises continuously passing a sheet of cellulose through (1) a pretreatment bath containing propionic and acetic acids (2) a preliminary esterification bath containing propionic anhydride, propionic acid and a small amount of catalyst and (3) an esterification bath containing acetic and propionic anhydrides a catalyst and an aliphatic ether having a boiling point above 70° C.

CARL J. MALM.
CHARLES L. FLETCHER.